US006655232B2

United States Patent
Fujikawa et al.

(10) Patent No.: US 6,655,232 B2
(45) Date of Patent: Dec. 2, 2003

(54) HYDRAULIC CONTROLLER FOR TRANSMISSION

(75) Inventors: Atsushi Fujikawa, Wako (JP); Shuji Ichijo, Wako (JP); Yukihiko Fukushima, Wako (JP); Makoto Sumi, Wako (JP); Mitsuro Ohtaki, Wako (JP); Katsuyuki Narai, Wako (JP); Takashi Hasegawa, Wako (JP); Shuichi Fujimoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/125,387

(22) Filed: Apr. 19, 2002

(65) Prior Publication Data
US 2002/0170383 A1 Nov. 21, 2002

(30) Foreign Application Priority Data

| May 15, 2001 | (JP) | ........................................ 2001-144367 |
| May 15, 2001 | (JP) | ........................................ 2001-144369 |

(51) Int. Cl.⁷ ............................................... F16H 59/00
(52) U.S. Cl. ...................................... 74/606 R; 474/28
(58) Field of Search .......................... 74/606 R; 474/28

(56) References Cited

U.S. PATENT DOCUMENTS 5,091,078 A * 2/1992 Ogawa ........................ 210/168
5,308,287 A * 5/1994 Gunsing ...................... 474/28

FOREIGN PATENT DOCUMENTS

| JP | 58-84387 | 6/1983 |
| JP | 3-121370 | 5/1991 |
| JP | 2589791 | 11/1998 |

* cited by examiner

*Primary Examiner*—Dirk Wright
(74) *Attorney, Agent, or Firm*—Westerman, Hattori, Daniels & Adrian, LLP

(57) ABSTRACT

A hydraulic controller comprises a first hydraulic control valve 60, which is mounted on an end face S1 of a first housing unit H1, an oil pump 50, which is mounted on the first hydraulic control valve 60, and an input shaft 1 of a transmission, which shaft is provided rotatably in a transmission housing. The oil pump 50 comprises an outer rotor 52 and an inner rotor 53 in a pump casing 51 and 54, which is mounted on the valve body of the first hydraulic control valve 60. The input shaft 1, which is inserted into the pump casing and fit into the inner rotor 53, rotates and drives the inner rotor. The oil pump 50 sucks oil from the bottom of the transmission housing and supplies it through the mounted part into the first hydraulic control valve 60.

10 Claims, 6 Drawing Sheets

HYDRAULIC CONTROLLER FOR TRANSMISSION

FIELD OF THE INVENTION

The present invention relates to a hydraulic controller used for a transmission which comprises an oil pump and a hydraulic control valve.

The present invention further relates to a hydraulic controller for a transmission which comprises an oil pump whose pumping action is generated by rotating an inner rotor (including an inner gear) that meshes with an outer rotor (including an outer gear), the inner rotor being positioned inside the internal circumference of the outer rotor. Such an oil pump can be, for example, a trochoidal pump or an internal gear pump.

BACKGROUND OF THE INVENTION

For hydraulically executing the shift control of a transmission, various types of hydraulic controller have been in use, and hydraulic controllers are incorporated in transmissions for hydraulic shift control. Such a hydraulic controller comprises an oil pump and hydraulic control valves, which are provided in the transmission housing. Various ways to incorporate such hydraulic elements in the transmission housing have been also known. For example, Japanese Laid-Open Patent Publication No. H03(1991)-121370 discloses a hydraulic controller in which hydraulic control valves are placed on the rear end of the transmission housing with a side cover covering these hydraulic control valves while an oil pump is placed at the front of the transmission housing.

In such a hydraulic controller, because the oil pump is positioned away from the hydraulic control valves in the transmission housing, it is necessary to form oil passages in the housing to supply oil from the oil pump to the hydraulic control valves. It is important to lay out the passages without complicating the arrangement. If the arrangement becomes complicated, then the length of oil passages tends to become longer. This problem can result in an increase in the flow resistance of oil passages, leading to an appreciable pressure loss, which reduces the efficiency of the pump.

There is an arrangement in which valve bodies constitute a pump casing wherein an outer rotor, an inner rotor, etc. are placed. However, the valve bodies are made of an aluminum material for weight saving while the oil pump is made of an iron material for strength. If valve bodies are to constitute a pump casing, then a question is what material it should be made of. For example, if valve bodies are made of an aluminum material, then the pump casing formed with these valve bodies may lack sufficient strength. In addition, if a rotor member made of an iron material is to be used in a pump casing made of an aluminum material, then the clearance between them in assembled condition must be larger than when both parts are made of an identical material. Without such a precaution, the pump will experience a reduction in volumetric efficiency. On the other hand, if the valve bodies are made of an iron material, then these problems will be solved, but this will contribute to the total weight of the transmission.

By the way, oil pumps of the type described above include, for example, trochoidal pumps and internal gear pumps. In such a pump, an inner rotor (including an inner gear) is positioned inside the internal circumference of an outer rotor (including an outer gear), and pumping action is generated by rotating the inner rotor, which meshes with the outer rotor.

Such an oil pump is mounted, for example, on an input shaft of a transmission and driven by the rotation of an engine to produce hydraulic pressure for shift control, etc. The pump as a unit does not have its own drive shaft because it is intended to be mounted on the input shaft of the transmission or a drive shaft which is connected directly with the output shaft of the engine. Therefore, the pump as a unit in preassembled condition has only an inner rotor and an outer rotor in a pump casing. The outer rotor is positioned (centered) and retained in the rotor-accommodating room of the pump casing while the inner rotor is placed, without any restriction, in the outer rotor.

When the pump is mounted on the drive shaft, the drive shaft fits into a bore provided through the inner rotor. As mentioned above, because the inner rotor is free in the outer rotor and not centered, it is difficult to insert and fit the drive shaft into the bore of the inner rotor in assembly process. To solve this problem, Japanese Utility-Model Publication No. 2589791 discloses an arrangement which makes the fitting of the drive shaft simple. In this arrangement, a taper is provided at an end face of the bore of the inner rotor (inner gear), and also a taper is provided at an end face of a cylindrical bush-like bearing, which is provided in the transmission housing to support the drive shaft, rotatably When the tapered part of the bearing is inserted into the tapered part of the bore of the inner rotor, the inner rotor is mounted and centered in the housing. In this condition, the drive shaft is fit into the bore of the inner rotor, which has been already centered in the housing.

However, this arrangement is disadvantageous because it limits the order of assembly for mounting the components of the pump in the transmission housing. In the order of assembly, the cylindrical bearing must be placed in the housing first, on which bearing, the inner rotor is mounted for centering. Also, this arrangement does not allow for the pump to be assembled independently as a unit. This is a problem because the components of the pump must be managed as independent parts in assembly processes until the final assembly of the pump to the transmission. Another problem is that as the pump is not assembled as a unit, the performance of the pump cannot be tested as a unit.

Japanese Laid-Open Utility-Model Publication No. S58 (1983)-84387 discloses an arrangement for the centering of the inner rotor. In this arrangement, the inner rotor is provided with a cylindrical guide portion which protrudes from one end face thereof, and this guide portion is inserted into a guide-receiving bore formed in the casing. By this arrangement, the inner rotor of the pump can be centered as a unit, so the pump can be easily mounted on the drive shaft. However, in this case, as the inner rotor is provided with a cylindrical guide portion, not only the machining of the guide portion is an extra process, but also the grinding of the end face of the inner rotor is made difficult because of the existence of this guide portion.

SUMMARY OF THE INVENTION

It is an object of the present invention to provide a hydraulic controller which comprises an oil pump and hydraulic control valves placed next to one another in a compact manner.

It is another object of the present invention to provide a hydraulic controller which comprises a shift control valve whose valve body is made of an aluminum material and an oil pump made of an iron material.

It is yet another object of the present invention to provide a hydraulic controller which comprises an oil pump whose inner rotor is centered even while the pump exits as a preassembled unit. The present invention provides this centering without forming a protrusion like the above mentioned guide portion provided on an end face of the inner rotor.

A hydraulic controller according to the present invention comprises a valve body for a hydraulic control valve (for example, the valve body of the first hydraulic control valve 60 described in the following embodiment), an oil pump and a pump drive shaft (for example, the input shaft 1 of a transmission described in the embodiment). The valve body is mounted on an internal wall (for example, the end face S1 of the first housing unit H1 in the following embodiment) of a transmission housing (the first housing unit H1), the oil pump is mounted on the valve body, and the pump drive shaft is provided rotatably in the transmission housing. In this hydraulic controller, the oil pump comprises a pump casing, which is mounted to the valve body, an outer rotor and an inner rotor, both of which are provided in the pump casing. The pump drive shaft is inserted into the pump casing and fit into the inner rotor, so that the inner rotor is rotated and driven by the pump drive shaft. Furthermore, the oil pump sucks oil from an oil tank, which is formed at the bottom of the transmission housing, and supplies it through the mounting surface to the valve body into the valve body of the hydraulic control valve.

In the construction of the hydraulic controller, the oil pump is mounted directly on the valve body to make the supply of oil to the control valve simple. As a result, the oil pump is operated efficiently with little pressure loss. Moreover, as the oil pump is mounted on the valve body, which is mounted on the transmission housing, the assembly of the oil pump is simple, and the hydraulic controller as a whole is compact.

It is preferable that the pump casing, the outer rotor and the inner rotor be made of an iron material and that the valve body be made of an aluminum material. In this way, the oil pump is made not only with sufficient strength but also with high volumetric efficiency without being affected from thermal expansion. Also, the valve body, which is comparatively larger than the pump casing, is made of an aluminum material for saving weight. As a result, the hydraulic controller as a whole is light and compact.

It is also preferable that a pump-accommodating concave be formed in the internal wall of the transmission housing. With this arrangement, when the valve body of the hydraulic control valve is mounted on the internal wall, the oil pump, which is already mounted on the valve body, will be preferably accommodated in the pump-accommodating concave. As the oil pump is accommodated inside the internal wall of the transmission housing, the hydraulic controller is made more compact.

Such an oil pump used for a hydraulic controller according to the present invention comprises a pump casing, an outer rotor, an inner rotor and a pump cover. The pump casing has a rotor-accommodating room (for example, the space defined by the rotor-accommodating hollow 51a described in the following embodiment), in which the outer rotor is accommodated and held rotatably. The inner rotor is positioned in the outer rotor, and the pump cover is mounted on the pump casing, covering the rotor-accommodating room, where the outer rotor and the inner rotor are positioned. A pump drive shaft (for example, the input shaft 1 of a transmission described in the following embodiment), which is inserted through an insertion bore (for example, the fitting recess 53b and the through hole 54e in the following embodiment) formed through the pump casing and the pump cover, fits into a bore provided in the inner rotor, so that the pump drive shaft can rotate and drive the inner rotor. In this case, the pump drive shaft is held rotatably with a bearing, which is retained in the insertion bore formed in the pump casing. Because the internally extending axial end of the bearing protrudes into the rotor-accommodating room, it is received in a fitting recess formed on the end face of the inner rotor that faces the pump casing. As a result, the inner rotor is centered and held by the bearing.

In this arrangement, as the outer rotor and the inner rotor are positioned in the rotor-accommodating room, which is provided in the pump casing, the internally extending axial end of the bearing, which is retained in the insertion bore of the pump casing, protrudes into the rotor-accommodating room and is received in the fitting recess of the inner rotor. In this way, the inner rotor is centered and held by the internal end of the bearing. As a result, the oil pump as an independent unit, which is assembled with the outer rotor and the inner rotor mounted in the rotor-accommodating room and covered by the pump cover (i.e., in the condition before a pump drive shaft is inserted), has the inner rotor already centered. Therefore, it is easy to mount the oil pump, in which process, the drive shaft for the pump is inserted through the insertion bore, which is formed through the pump casing and the pump cover, and fit into the bore of the inner rotor.

It is preferable that the pump casing be formed with at least a suction port or a delivery port positioned around the insertion bore, where the bearing is to be retained. The pump casing needs to be formed with a sufficient thickness in the axial direction especially at the part where the bearing is to be held. Therefore, the suction port and the delivery port are formed in this axially thickened part to exploit the space effectively in the pump casing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
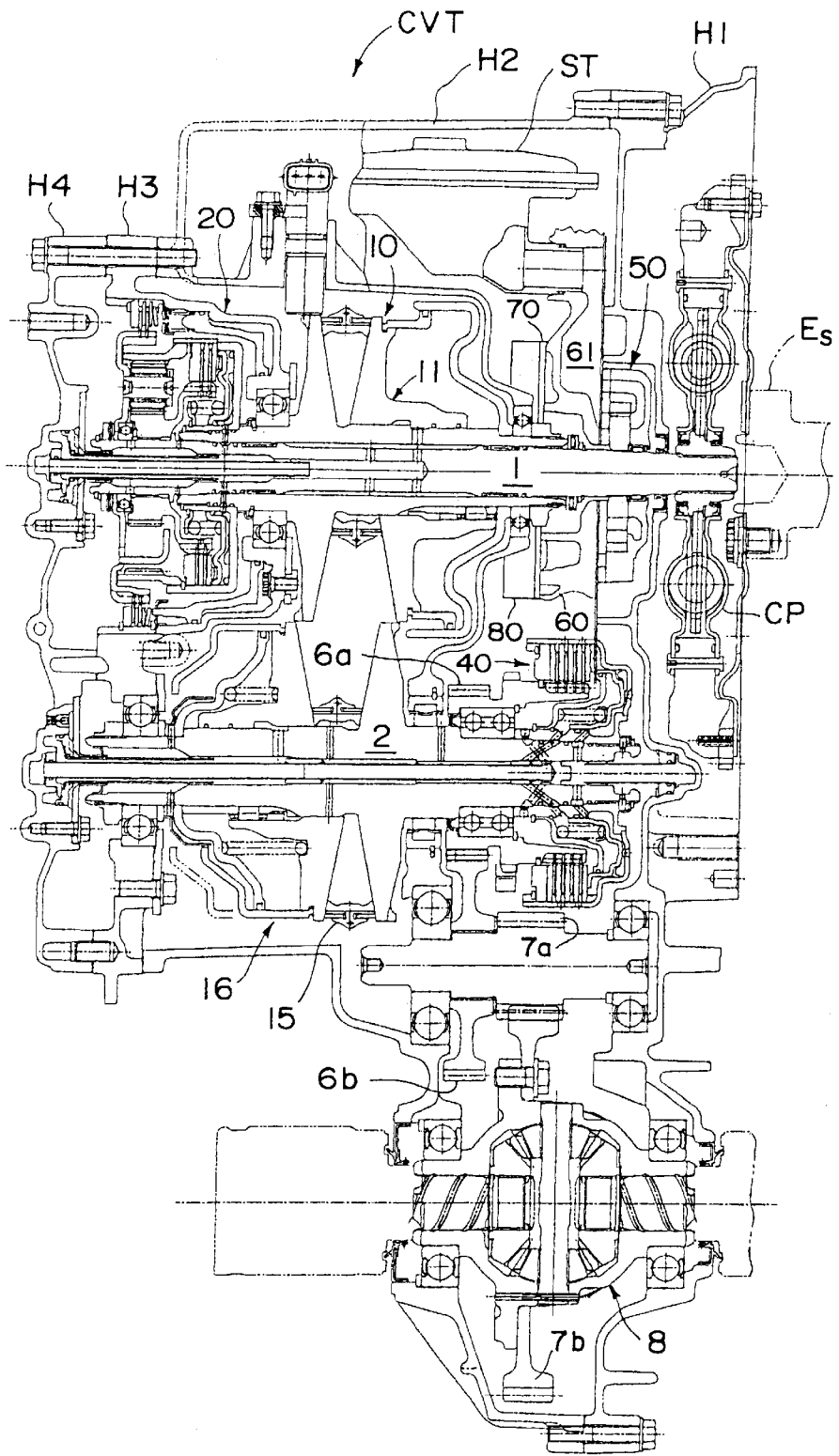
FIG. 1 is a sectional view of a belt-type continuously variable transmission, which comprises a hydraulic controller according to the present invention.
Figure 2:
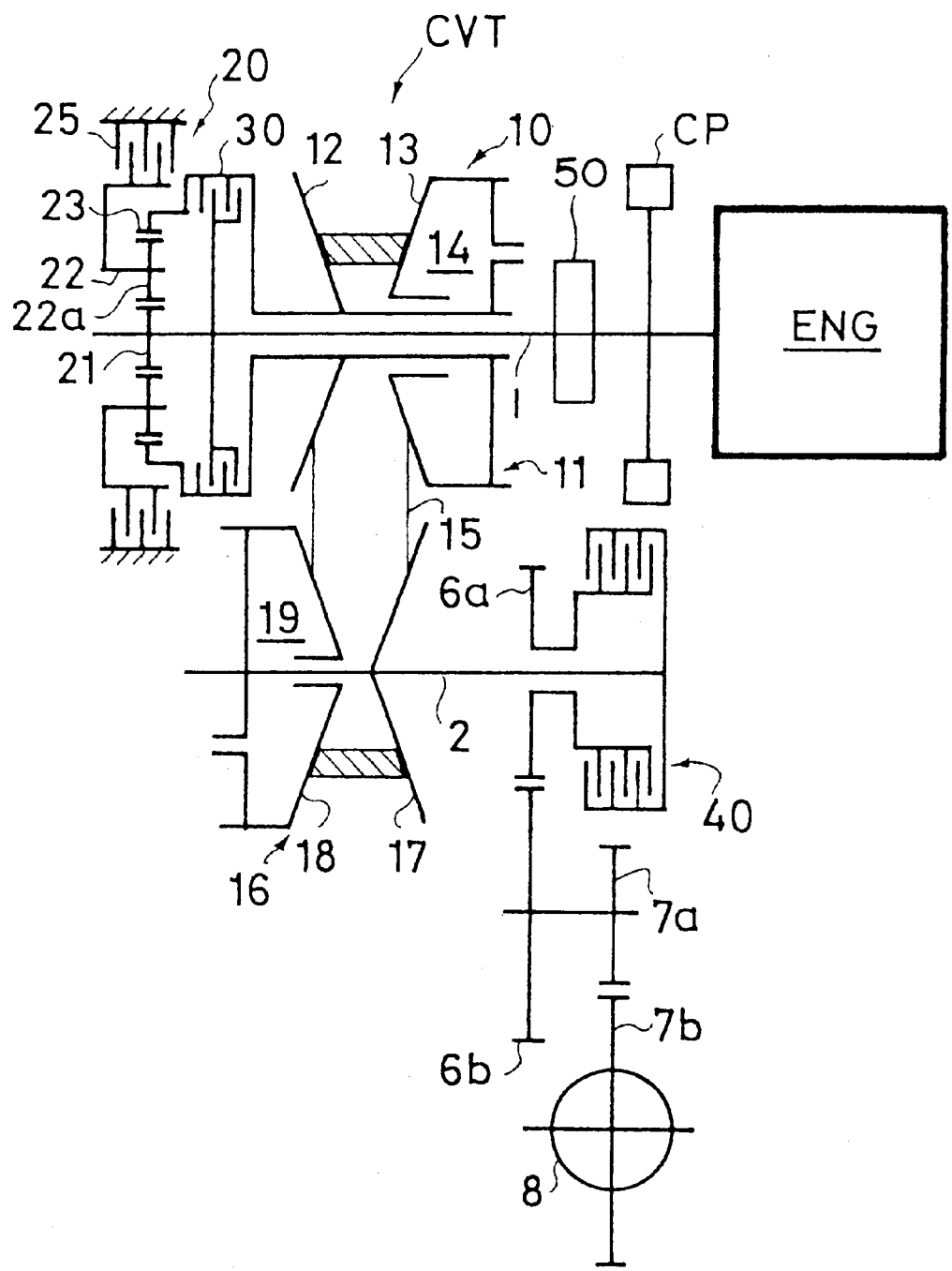
FIG. 2 is a schematic diagram showing the power transmission paths of the continuously variable transmission

Now, a preferred embodiment according to the present invention is described in reference to the drawings. FIGS. 1 and 2 show a belt-type continuously variable transmission CVT, which comprises a hydraulic controller according to the present invention. This belt-type continuously variable transmission CVT comprises an input shaft 1, a countershaft 2, a metal V-belt mechanism 10, a planetary gear type forward/reverse switching mechanism 20, a starting clutch mechanism 40, power transmission gear trains 6a, 6b, 7a and 7b, and a differential mechanism 8 in a transmission housing. The input shaft 1 of the transmission is connected through a coupling mechanism CP to the output shaft Es of the engine ENG. The metal V-belt mechanism 10 connects rotationally the input shaft 1 and the countershaft 2, which is provided parallel with the input shaft 1. The forward/reverse switching mechanism 20 is disposed over the input shaft 1, and the starting clutch mechanism 40 is disposed on the countershaft 2. In addition, an oil pump 50 is provided on the input shaft 1 of the transmission.

The transmission housing comprises first, second, third and fourth housing units H1~H4, which are fixed to one another by means of bolts. The coupling mechanism CP is mounted in the first housing unit H1, and the starting clutch mechanism 40, the power transmission gear trains 6a, 6b, 7a and 7b, and the differential mechanism 8 are positioned in a room created by the first and second housing units H1 and H2. The metal V-belt mechanism 10 is positioned in a room created by the second and third housing units H2 and H3, and the forward/reverse switching mechanism 20 is positioned in a room created by the third and fourth housing units H3 and H4.

The metal V-belt mechanism 10 comprises a drive pulley 11, which is disposed over the input shaft 1, a driven pulley 16, which is disposed on the countershaft 2, and a metal V-belt 15, which is disposed around these pulleys 11 and 16. The drive pulley 11 comprises a stationary pulley half 12, which is disposed rotatably on the input shaft 1, and a movable pulley half 13, which rotates with stationary pulley half 12 and, at the same time, movable with respect to the stationary pulley half 12 in the axial direction of the pulley 11. The axial shift of the movable pulley half 13 is executed by the pressure supplied into a drive-pulley cylinder chamber 14 provided to the drive pulley 11. On the other hand, the driven pulley 16 comprises a stationary pulley half 17, which is fixed on the countershaft 2, and a movable pulley half 18, which rotates with the stationary pulley half 17 and movable with respect to the stationary pulley half 17 in the axial direction of the pulley. The axial shift of the movable pulley half 18 is executed by the pressure supplied into a driven-pulley cylinder chamber 19 provided to the driven pulley 16.

In this construction, the hydraulic pressures supplied into these cylinder chambers 14 and 19, respectively, are controlled to generate appropriate thrusts that act on the movable pulley halves 13 and 18 and vary appropriately the widths of the drive and driven pulleys 11 and 16. This pressure control enables the pitch radii of the respective pulleys 11 and 16 for the V belt 15 to change continuously, and thus the speed change ratio of the transmission is variable continuously.

The forward/reverse switching mechanism 20 is a planetary gear train, which comprises a sun gear 21, a carrier 22 and a ring gear 23. The sun gear 21 is connected to the input shaft 1, and the carrier 22 is rotatable coaxially with the sun gear 21 and retains rotatably a plurality of pinions 22a, which mesh with the sun gear 21. The ring gear 23 is also rotatable coaxially with the sun gear 21 and meshes with the pinions 22a. In addition, the forward/reverse switching mechanism 20 includes a reverse brake 25, which can hold the carrier 22 stationary, and a forward clutch 30, which engages and disengages the sun gear 21 to and from the ring gear 23. The reverse brake 25 and the forward clutch 30 are charged and discharged with actuation pressure for engagement and disengagement.

In this arrangement, when the forward clutch 30 is actuated for engagement while the reverse brake 25 is not engaged, the sun gear 21 and the ring gear 23 are connected to each other. In this condition, the sun gear 21, the carrier 22 and the ring gear 23 are all rotatable in unison with the input shaft 1, and the drive pulley 11 is rotatable in the same direction as the input shaft 1 (forward drive direction). On the other hand, when the forward clutch 30 is released and the reverse brake 25 is actuated for engagement, the carrier 22 is held stationary. In this condition, the ring gear 23 is rotatable in the direction opposite to that of the sun gear 21, so the drive pulley 11 is now also rotatable in the direction opposite to that of the input shaft 1 (reverse drive direction).

With this construction, the rotation of the input shaft 1 of the transmission is switched by the forward/reverse switching mechanism 20 and transmitted to the drive pulley 11 either in the forward drive or rearward drive direction. The speed of this rotation is varied continuously by the metal V-belt mechanism 10 and is transmitted to the countershaft 2. Then, the starting clutch 40, which is mounted on the countershaft 2, controls the transmission of power to the power transmission gear 6a. The rotational driving force transmitted through the starting clutch 40 to the power transmission gear 6a is then transmitted through the power transmission gear trains 6a, 6b, 7a and 7b, which includes the power transmission gear 6a, to the differential mechanism 8 and to the right and left drive wheels (not shown). With this arrangement, the rotational driving force transmitted to the wheels is controllable by controlling the engagement operation of the starting clutch 40, for example, in a startup control of the vehicle. The starting clutch 40 is a hydraulically actuated clutch, whose engagement is controlled through the supply of hydraulic pressure. Detailed description of the starting clutch 40 is not provided here.

In this continuously variable transmission, the reverse brake 25 and the forward clutch 30, which constitute the forward/reverse switching mechanism 20, are also charged and discharged hydraulically to switch the transmission between its forward and rearward drive modes, and the starting clutch 40 is also charged hydraulically to start the vehicle. Then, the drive- and driven-pulley cylinder chambers 14 and 19, which constitute the metal V-belt mechanism 10, are charged and discharged hydraulically to execute the continuous rotational speed change of the transmission. For these hydraulic operations, the hydraulic controller comprises an oil pump 50 to supply oil and a hydraulic control valve assembly used for controlling the charging and discharging of oil from the oil pump 50. This hydraulic control valve assembly comprises a first hydraulic control valve 60, a separator plate 70 and a second hydraulic control valve 80. The housings of the first and second hydraulic control valves 60 and 80 are respectively made of an aluminum material.

Figure 3:
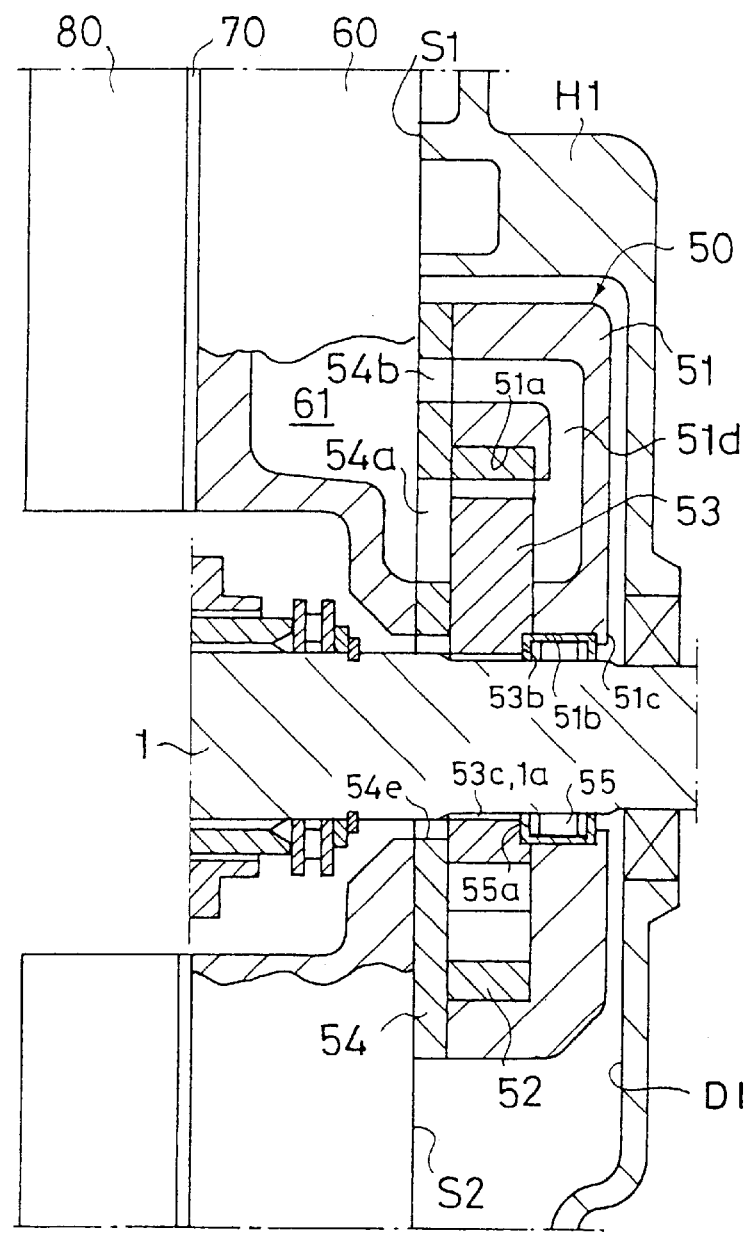
FIG. 3 is an enlarged partial sectional view showing a mount for an oil pump.
Figure 4:
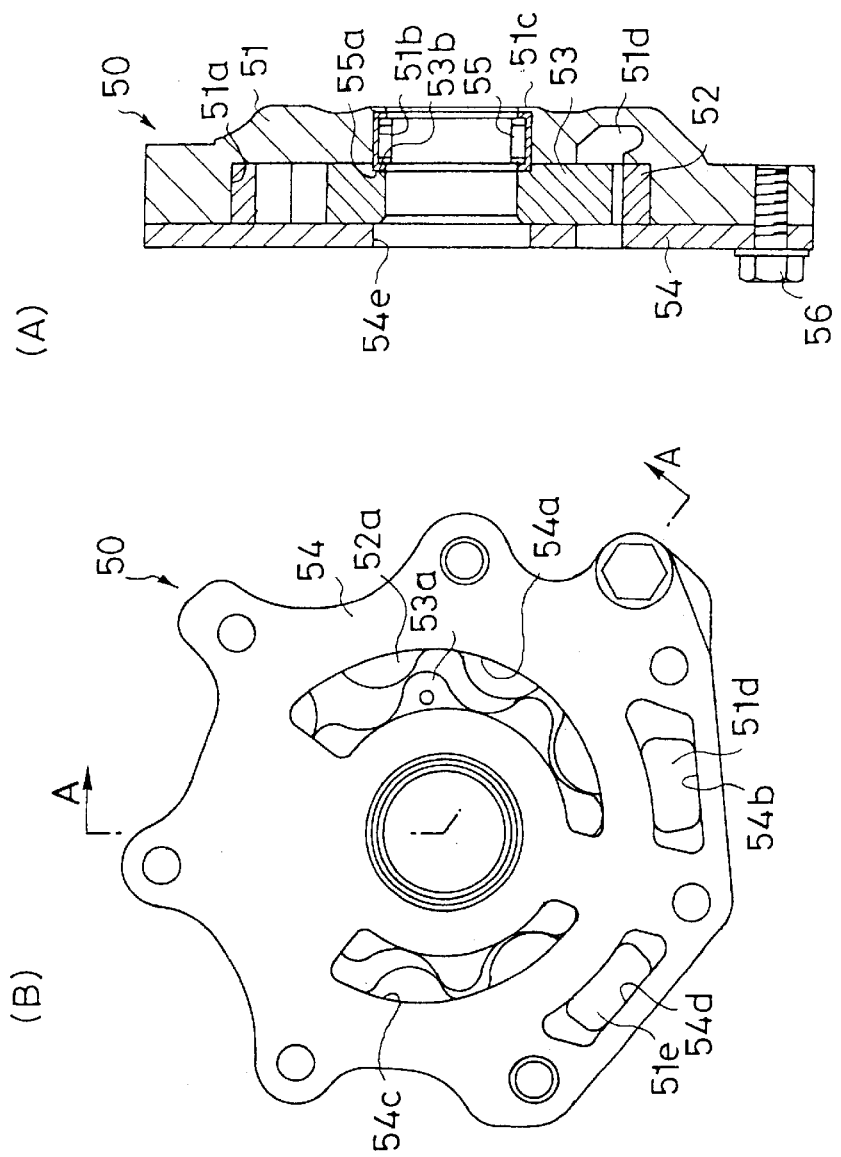
FIG. 4 is a side view and a sectional view of the oil pump only.
Figure 5:
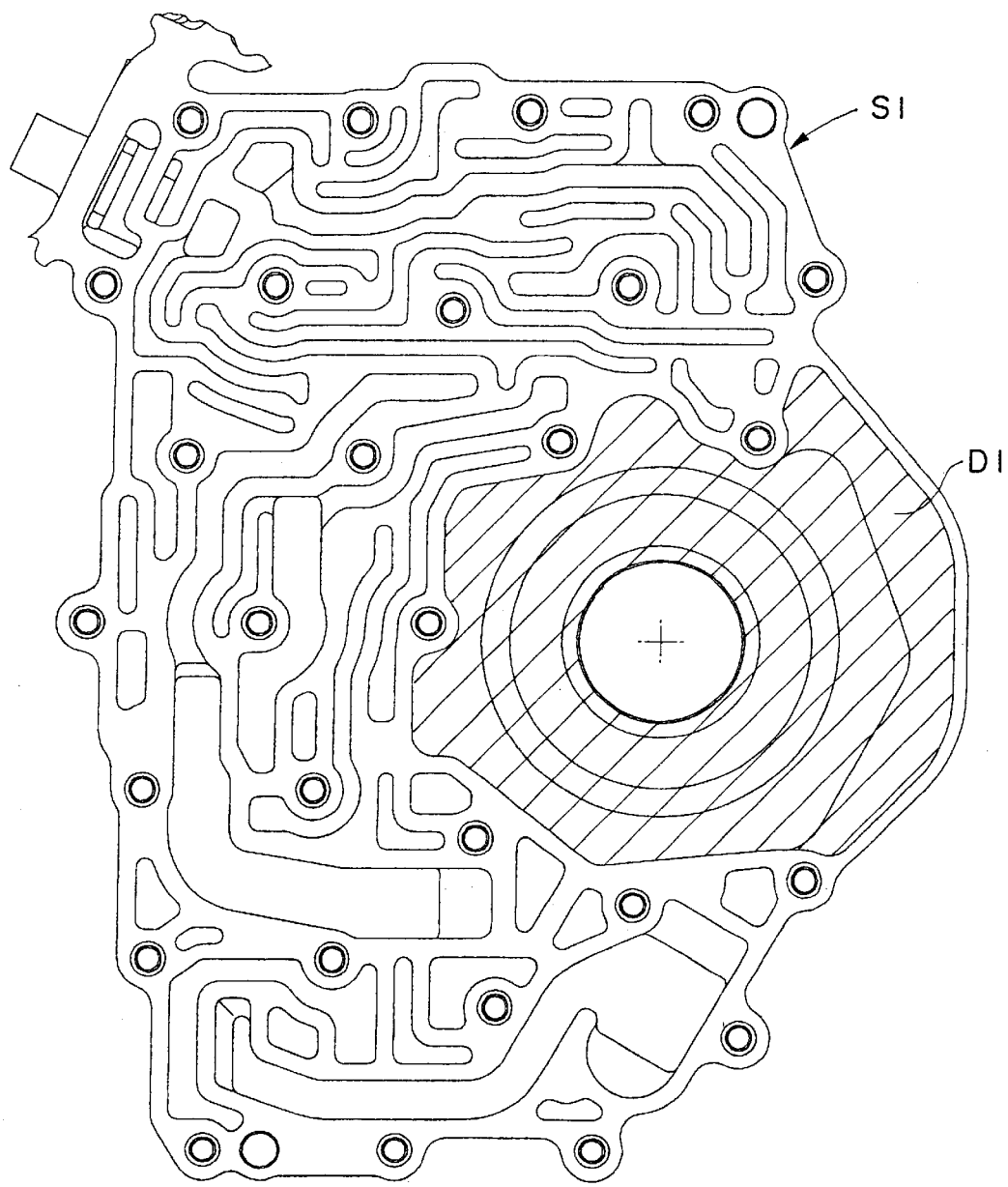
FIG. 5 is a view of an end face of a first housing, on which face a first hydraulic valve body is placed and mounted.

The oil pump 50 is mounted on the input shaft 1 of the transmission as shown in FIG. 1, and this specific part is shown in enlargement in FIG. 3. In addition, FIG. 4 shows the construction of the oil pump 50 independently, in the condition prior to the mounting on the input shaft 1. The oil pump 50 is mounted onto the end face S2 (on the right side in FIG. 1 and FIG. 3) of the first hydraulic control valve 60, which is mounted onto the end face S1 (on the left side in FIG. 1 and FIG. 3) of the first housing unit H1 of the transmission housing. The end face S1 of the first housing unit H1 is shown in FIG. 5. The separator plate 70 and the second hydraulic control valve 80 are overlaid and mounted, respectively, on the first hydraulic control valve 60 as shown in the drawings.

In the condition where the oil pump 50 is mounted on the end face of the first hydraulic control valve 60, which is mounted on the end face S1 of the first housing unit H1, the oil pump 50 is positioned in the first housing unit H1 beyond the end face S1 (on the right side in FIG. 1 and FIG. 3), where a concave D1 is provided for the accommodation of the oil pump. The hatched area in FIG. 5 is where the pump-accommodating concave D1 is formed in the first housing unit H1. In this way, the oil pump 50 is positioned compactly in the transmission housing.

The oil pump 50 comprises a pump casing 51, an outer rotor 52, an inner rotor 53 and a pump cover 54. The pump casing 51 has a rotor-accommodating hollow 51a, where the outer rotor 52 is accommodated and received rotatably with its outer periphery. The outer rotor 52 is provided with internal trochoidal teeth 52a, and the inner rotor 53 is placed in the space surrounded by the internal trochoidal teeth 52a. The pump cover 54 is fixed on the pump casing 51 with bolts 56, covering the outer rotor 52 and the inner rotor 53 in the rotor-accommodating hollow 51a. The pump casing 51, the outer rotor 52, the inner rotor 53 and the pump cover 54 are made of an iron material (for example, cast iron or steel). Furthermore, an insertion bore 51b is formed axially through the pump casing 51, with a ring-like retainer 51c being provided coaxially with the insertion bore 51b at an end, and a bearing 55 is inserted and placed in the insertion bore 51b. The bearing 55 is fixed at a predetermined position as it hits the ring-like retainer 51c. In this condition, the axially inward end 55a of the bearing 55 protrudes into the rotor-accommodating hollow 51a. To receive this protrusion, a ring-like fitting recess is provided at an end face of the inner rotor 53. As a result, in the condition where the oil pump 50 is independently assembled as shown in FIG. 4, the inner rotor 53 is supported by the periphery of the inward end 55a of the bearing 55 and thereby positioned coaxially to and rotatable with the bearing 55. On the other hand, the rotor-accommodating hollow 51a, which holds the outer rotor 52 rotatably, is positioned eccentric to the center of the bearing 55 by the pump casing 51. As a result, the internal trochoidal teeth 52a of the outer rotor 52 mesh eccentrically with the external trochoidal teeth 53a of the inner rotor 53.

As shown in FIG. 4B, the pump cover 54 is provided with suction ports 54a and 54b and delivery ports 54c and 54d. In addition, the pump casing 51 is provided with a suction room 51d, which is in fluid communication with the suction ports 54a and 54b, and a delivery room 51e, which is in fluid communication with the delivery ports 54c and 54d. These suction room 51d and delivery room 51e are to improve the efficiency of the suction and delivery of the oil pump 50 and are formed around the insertion bore 51b of the pump casing 51, where the bearing 55 is plated. This construction is to exploit the space occupied by the pump casing 51, whose thickness axially is relatively large because of its role for holding the bearing 55.

The pump cover 54 is provided with a through hole 54e coaxially with the bearing 55. For the mounting of the oil pump 50, the input shaft 1 of the transmission is inserted through the through hole 54e and into the bearing 55. As the inner rotor 53 of the oil pump 50 is centered and supported by the bearing 55 as described above, the mounting of the oil pump 50 on the input shaft 1 is carried out easily. As the pump casing 51 and the pump cover 54 are fixed on the end face S2 of the first hydraulic control valve 60 with bolts, the input shaft 1 is supported rotatably by the bearing 55. Because the input shaft 1 is provided with external splines 1a, which are formed to mesh with the internal splines 53c of the inner rotor 53 of the oil pump 50, the input shaft 1 and the inner rotor 53 are rotatable together as a one-piece body.

The first hydraulic control valve 60 is provided with a suction passage 61 and a delivery passage (not shown), which meet with the suction ports 54a and 54b and the delivery ports 54c and 54d, respectively, in the condition where the pump casing 51 and the pump cover 54 are fixed on the end face S2 of the first hydraulic control valve 60. This suction passage 61 is connected through the first hydraulic control valve 60 to a strainer ST, which is positioned in an oil tank defined at the bottom of the transmission housing as shown in FIG. 1. Because of this arrangement, oil in the tank is sucked through the strainer ST into the suction passage 61.

In the belt-type continuously variable transmission CVT constructed as described above, when the input shaft 1 is driven by the engine ENG, the inner rotor 53 of the oil pump 50, which is rotated with the input shaft 1, rotates the outer rotor 52 eccentrically because the internal trochoidal teeth 52a of the outer rotor 52 are meshed with the external trochoidal teeth 53a of the inner rotor 53. As a result, oil is sucked through the strainer ST, the suction passage 61, the suction room 51d and the suction ports 54a and 54b and delivered through the delivery ports 54c and 54d and the delivery room 51e and supplied to the first hydraulic control valve 60.

As described previously, the inner rotor 53 has a ring-like fitting recess 53b, which is formed on one end face thereof. This fitting recess 53b may be provided on both the end faces of the inner rotor 53, so that the inner rotor 53 can be mounted without directional restriction, making the assembly process simple.

As mentioned above, the first hydraulic control valve 60 is provided with a delivery passage (not shown), which meets with the delivery ports 54c and 54d, at the part thereof where the pump cover 54 is mounted. Therefore, the oil delivered as described above flows from the delivery ports 54c and 54d through the delivery passage into the first hydraulic control valve 60. From the oil being supplied in this way, the first hydraulic control valve 60, the separator plate 70 and the second hydraulic control valve 80 generate control pressures that are necessary for operating the metal V-belt mechanism 10, the forward/reverse switching mechanism 20 and the starting clutch 40.

Figure 6:
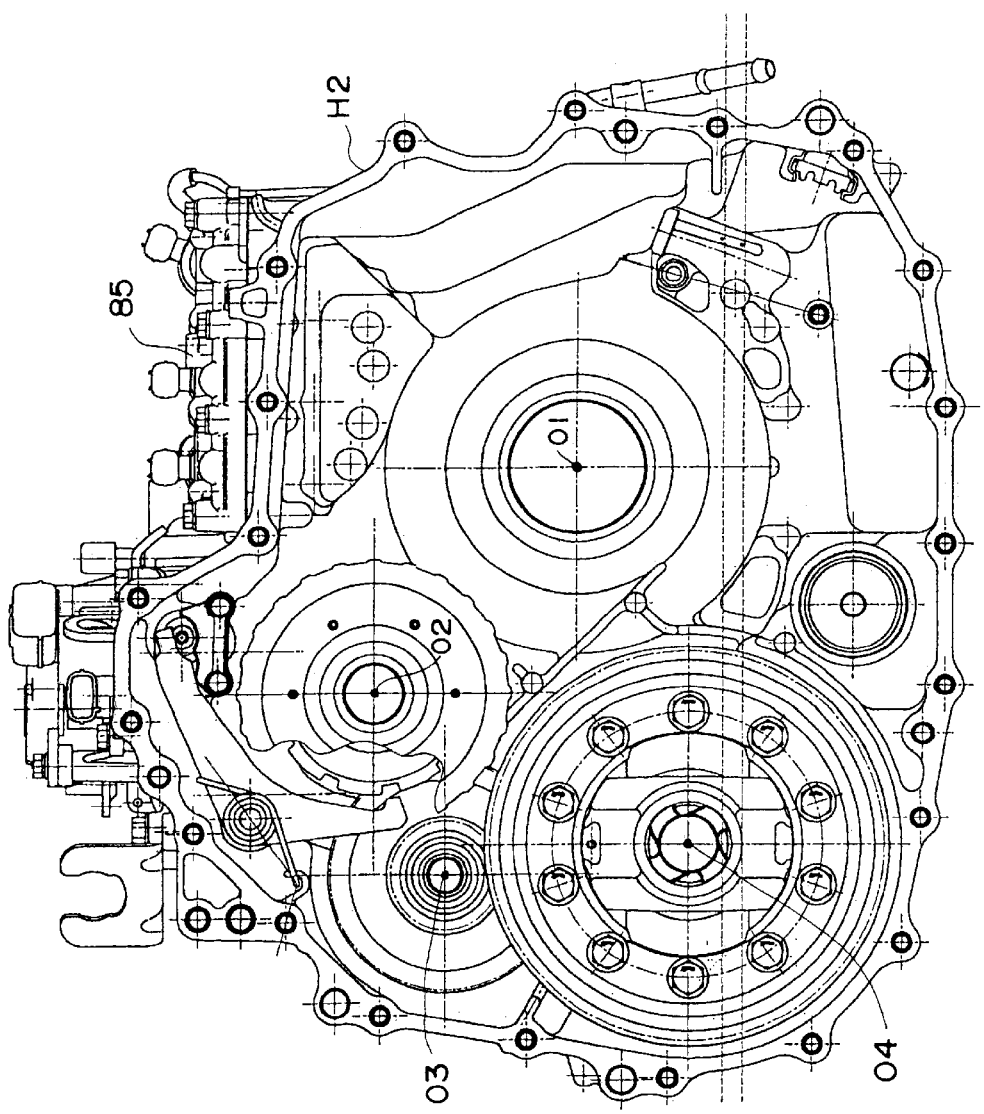
FIG. 6 is a side view of the continuously variable transmission without the first housing.

For this purpose, the belt-type continuously variable transmission CVT is equipped additionally with the third hydraulic control valve 85, which is positioned on the second housing unit H2 as shown in FIG. 6. The first hydraulic control valve 60, the second hydraulic control valve 80 and the third hydraulic control valve 85 are used together to generate the control pressures. For ease of maintenance, mainly electrically controlled parts such as solenoid valves and parts which may need operational inspection or replacement are provided as the third hydraulic control valve 85 on the outer surface of the transmission.

FIG. 6 shows the belt-type continuously variable transmission CVT without the first housing unit H1 and without the parts placed in the first housing unit H1, as a view in the direction from the engine. In the drawing, the center of the input shaft 1 is indicated with marking "O1", the center of the countershaft 2 is marked "O2", the center of the shaft on which the power transmission gears 6b and 7a are mounted is marked "O3", and the center of the differential mechanism 8 is marked "O4".

As described above, a hydraulic controller according to the present invention comprises an oil pump which is directly mounted to the valve body of a hydraulic control valve. Therefore, oil is supplied from the oil pump to the valve body of the hydraulic control valve in a very simple way, and the oil pump is operated very efficiently with little pressure loss. Furthermore, the oil pump is mounted on the valve body of the hydraulic control valve, which is mounted on the transmission housing. This construction makes not only the mounting of the oil pump simple but also the whole of the hydraulic controller compact.

It is preferable that the pump casing, the outer rotor and the inner rotor be made of an iron material while the valve body be made of an aluminum material. In this way, the oil pump can have sufficient strength and will not be affected from thermal expansion. As a result, the oil pump can have a high volumetric efficiency. As the valve body is made of an aluminum material for weight saving, the hydraulic controller as a whole is made compact with a light weight.

It is also preferable that a pump-accommodating concave be formed in the internal wall of the transmission housing and that when the valve body is mounted on the internal wall, the oil pump, which is mounted on the valve body, be accommodated in the pump-accommodating concave. As the oil pump is accommodated inside the internal wall of the transmission housing, the hydraulic controller is compact.

According to the construction for an oil pump of the present invention, when the outer rotor and the inner rotor are positioned in the rotor-accommodating room, which is provided in the pump casing, the internally extending axial end of the bearing, which is retained in the insertion bore of the pump casing, protrudes into the rotor-accommodating room, so that the internally extending axial end of the bearing is received in a fitting recess provided in the inner rotor. In this way, the inner rotor is centered and held by the internal end of the bearing. As a result, the oil pump as an independent unit, which is assembled with the outer rotor and the inner rotor mounted in the rotor-accommodating room and covered by the pump cover, has the inner rotor already centered. This condition of the oil pump makes easy the following assembly process of mounting the oil pump, where the drive shaft for the pump is inserted through the insertion bore, which is formed through the pump casing and the pump cover, and fit into the bore of the inner rotor.

It is preferable that the pump casing be formed with at least a suction port or a delivery port positioned around the insertion bore, where the bearing is to be retained. The pump casing needs to be formed with a sufficient thickness in the axial direction especially at the part where the bearing is to be held. Therefore, the suction port and the delivery port are formed in this axially thickened part to exploit the space effectively in the pump casing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Related Applications

This application claims the priority of Japanese Patent Application No.2001-144367 filed on May 15, 2001 and Japanese Patent Application No.2001-144369 filed on May 15, 2001, which are incorporated herein by reference.

What is claimed is:

1. A hydraulic controller for a transmission, comprising:
a hydraulic control valve, which is mounted on an internal wall of a transmission housing;
an oil pump, which is mounted on a valve body of said hydraulic control valve; and
a pump drive shaft, which is provided rotatably in said transmission housing;
wherein:
said oil pump comprises a pump casing assembly, which is mounted to said valve body, an outer rotor and an inner rotor, both of which are provided in said pump casing assembly;
said pump drive shaft is inserted into said pump casing assembly and fit into said inner rotor, so that said inner rotor is rotated and driven by said pump drive shaft; and
said oil pump sucks oil from an oil tank, which is formed at a bottom of said transmission housing, and supplies it through a delivery passage, which is formed at a mounting surface to said valve body, to said hydraulic control valve.

2. The hydraulic controller as set forth in claim 1, wherein:
said pump casing assembly, said outer rotor and said inner rotor are made of an iron material; and
said valve body is made of an aluminum material.

3. The hydraulic controller as set forth in claim 1, wherein:
a pump-accommodating concave is formed in said internal wall of said transmission housing; and
when said valve body is mounted on said internal wall, said oil pump, which is mounted on said valve body, is accommodated in said pump-accommodating concave.

4. The hydraulic controller as set forth in claim 1, wherein:
said oil pump sucks oil from said oil tank through a suction passage, which is formed in said valve body, and through a strainer, which is connected to an end of said suction passage and positioned in said oil tank formed at the bottom of said transmission housing.

5. The hydraulic controller as set forth in claim 1, wherein:
said pump drive shaft comprises an input shaft of the transmission, which is mounted in said transmission housing.

6. The hydraulic controller as set forth in claim 1, wherein:
said oil pump comprises a trochoidal pump, in which internal trochoidal teeth of said outer rotor mesh eccentrically with external trochoidal teeth of said inner rotor.

7. The hydraulic controller as set forth in any of claims 1~6, wherein:
said oil pump comprises a pump casing member with a rotor-accommodating room, said outer rotor, which is accommodated and held rotatably in said rotor-accommodating room, said inner rotor, which is positioned in said outer rotor, and a pump cover member, which is mounted on said pump casing, covering said rotor-accommodating room, where said outer rotor and said inner rotor are positioned;
said pump casing assembly comprises said pump casing member and said pump cover member;
said pump drive shaft, which is inserted through an insertion bore formed through said pump casing member and said pump cover member, fits into a bore provided in said inner rotor, so that said pump drive shaft can rotate and drive said inner rotor;

said pump drive shaft is held rotatably with a bearing, which is retained in said insertion bore formed in said pump casing member; and an internally extending axial end of said bearing protrudes into said rotor-accommodating room, so said internally extending axial end of said bearing is received in a fitting recess formed on an end face of said inner rotor that faces said pump casing member, whereby said inner rotor is held by said bearing.

8. The hydraulic controller as set forth in claim 7, wherein:

said pump casing member is formed with at least a suction room or a delivery room positioned around said insertion bore, where said bearing is to be retained.

9. The hydraulic controller as set forth in claim 7, wherein:

said pump cover member is formed with a suction port opening and a delivery port opening; and said pump casing member is formed with a suction room, which connects to said suction port opening, and a delivery room, which connects to said delivery port opening.

10. The hydraulic controller as set forth in claim 9, wherein:

said suction room and said delivery room are formed around said insertion bore in an area which retains said bearing by a relatively large axial thickness.

* * * * *